(12) United States Patent
Underwood (10) Patent No.: US 6,439,279 B1
(45) Date of Patent: Aug. 27, 2002

(54) TREE SAW ATTACHMENT WITH TWEEZER ARM

(75) Inventor: Mark Underwood, Burr Oak, KS (US)

(73) Assignee: Great Plains Manufacturing, Incorporated, Salina, KS (US)

( * ) Notice: Subject to any disclaimer, the term of this patent is extended or adjusted under 35 U.S.C. 154(b) by 0 days.

(21) Appl. No.: 10/004,150

(22) Filed: Oct. 31, 2001

(51) Int. Cl.⁷ .............................................. A01G 23/08
(52) U.S. Cl. ..................... 144/34.6; 37/301; 56/16.4; 30/379; 83/928; 144/34.1; 144/336
(58) Field of Search .................... 56/16.4; 37/301; 30/379, 379.5; 83/846, 852, 928; 144/34.1, 34.5, 34.6, 336; 172/701.1, 701.3

(56) References Cited

U.S. PATENT DOCUMENTS

| 1,089,341 A | 3/1914 | Jack, Jr. | |
|---|---|---|---|
| 2,633,880 A | 4/1953 | Mattson | 144/34.6 |
| 2,821,217 A | 1/1958 | Shald | 144/34.6 |
| 3,004,570 A | 10/1961 | Clayton et al. | 144/34.6 |
| 3,033,253 A | 5/1962 | Purdy | 144/34.6 |
| 3,415,296 A | 12/1968 | Frankenberg | 144/34.6 |
| 3,557,850 A | 1/1971 | Owens | 144/34.6 |
| 3,626,477 A | 12/1971 | Fulghum, Jr. | 144/34.5 |
| 3,635,269 A | 1/1972 | Price | 144/34.6 |
| 3,804,138 A | 4/1974 | Adcock | 144/34.6 |
| 3,809,135 A | 5/1974 | Dove | 144/34.6 |
| 4,018,255 A | 4/1977 | Diggs | 144/34.1 |
| 4,164,247 A | 8/1979 | Wolf | 144/34.6 |
| 4,180,108 A | 12/1979 | Dove | 144/34.6 |
| 5,101,873 A | 4/1992 | Marshall | 144/34.5 |
| 5,329,752 A | 7/1994 | Milbourn | 56/16.4 |
| 5,479,971 A | 1/1996 | Marshall | 144/34.1 |
| 5,503,201 A | 4/1996 | Strickland et al. | 144/34.1 |
| 5,687,784 A | 11/1997 | Morgan | 144/34.6 |
| 5,950,699 A | 9/1999 | Dove | 144/34.6 |

Primary Examiner—W. Donald Bray
(74) Attorney, Agent, or Firm—Hovey Williams LLP

(57) ABSTRACT

A tree saw attachment (10) for use with a loader vehicle includes a base frame (11), a generally V-shaped blade assembly (12), a brush guard (13), and a tweezer arm assembly (14). A swingable tweezer arm (29) of the tweezer arm assembly is movable using a hydraulic cylinder (33) to grasp objects against an upper surface of the base frame or the blade assembly. The brush guard and tweezer arm assembly are removable from the base frame as a single unit to facilitate shipping and assembly. A sprayer assembly (90) is positioned within the base frame for applying a herbicide to tree stumps cut by the V-shaped blade assembly. The blade assembly can be a single integral blade (42), or can be formed of right and left blades (70, 71) with intermeshing projections (73, 74) secured to a rib member (36) along a centerline of the blade assembly.

27 Claims, 5 Drawing Sheets

TREE SAW ATTACHMENT WITH TWEEZER ARM

BACKGROUND OF THE INVENTION

1. Field of the Invention

The present invention relates generally to brush and tree saw attachments for front end loaders and the like. In particular, the present invention relates to a tree saw attachment having an improved blade structure and a tweezer arm to facilitate tree removal and brush clearing.

2. Description of the Related Art

Front end loaders are generally known in the art for use in performing a wide range of grading, digging, construction, brush clearing, lifting, and other related tasks. Front end loaders are typically in the form of a tractor-type vehicle or a skid-steer type vehicle having a pivoting loader arm or boom on which a variety of interchangeable work attachments can be mounted. For example, known attachments for brush and tree clearing include V-shaped blades with saw teeth, hydraulic clippers, reciprocating saw blades, rotating saw blades, and the like. These attachments are typically secured to the end of the loader arm or boom of the front end loader or to the front of a bull dozer type vehicle.

A number of V-shaped blades used for clearing brush and trees are disclosed in prior patents. For example, U.S. Pat. Nos. 2,633,880 (Mattson), 3,004,570 (Clayton et al.), 3,033,253 (Purdy), 3,415,296 (Frankenberg et al.), 3,809,135 (Dove), and 5,950,699 (Dove) all disclose V-shaped blades with saw teeth arranged to cut brush and trees during forward movement of a vehicle on which they are mounted. However, these conventional V-shaped blades lack an ability to pick up and move cut trees or brush to a brush pile efficiently.

Other types of attachments for tree and brush clearing are also disclosed in prior patents. For example, a tree shear having a pair of pincer-type cutting blades is shown in U.S. Pat. No. 5,503,201 (Strickland et al.). A tree cutting apparatus having a pair of opposing arcuate blades rotatably mounted on a frame is shown in U.S. Pat. No. 5,101,873 (Marshall). A tree cutting apparatus having a single arcuate blade mounted for rotating in two directions is disclosed in U.S. Pat. No. 5,479,971 (Marshall). A tree sawing machine having a reciprocating blade is disclosed in U.S. Pat. No. 1,089,341 (Jack, Jr.). These conventional tree cutting devices lack an ability to pick up and move cut trees or brush to a brush pile efficiently, and are generally not able to clear heavy brush and trees as quickly as V-shaped blades.

There is a need in the industry for an improved brush and tree clearing apparatus that can be attached to front end loaders or bull dozers, and that will increase the efficiency of brush and tree clearing operations.

SUMMARY OF THE INVENTION

It is an object of the present invention to provide an improved brush and tree clearing apparatus for a conventional front end loader that facilitates picking up and moving cut trees and brush to a pile.

It is a further object of the present invention to provide a brush and tree clearing apparatus with a tweezer arm that can be used in conjunction with a V-shaped cutting blade to grasp and carry cut trees and brush to a common pile.

It is a further object of the present invention to provide a brush and tree clearing apparatus having a brush guard and a tweezer arm assembly which are removably attached as a unit to a base frame carrying a V-shaped blade assembly.

It is a further object of the present invention to provide a brush and tree clearing apparatus having a V-shaped blade with an improved blade mounting arrangement and a compact shipping configuration.

It is a further object of the present invention to provide a brush and tree clearing apparatus having a V-shaped blade and a means for spraying a herbicide on the cut stumps as the blade passes over the stumps during brush clearing operations.

It is a further object of the present invention to provide an improved brush and tree clearing apparatus that can be used efficiently with front end loaders and bull dozers, and that is economical to manufacture, capable of a long operating life, and particularly well suited for cutting and clearing brush and trees and moving the same into a common pile.

In order to solve the problems with the prior art described above, the applicant has developed an improved brush and tree clearing apparatus for mounting to a front end loader or the like. The apparatus includes a base frame having a gusset that tapers to a point at a front side where a tubular receiver is provided. A V-shaped blade assembly is secured to the base frame and has a planar blade with cutting teeth along its edges. A mounting structure is secured to the top side of the planar blade and received within the tubular receiver. The planar blade is also secured along the lower edges of the gusset using threaded fasteners.

The base frame also has a pair of tubular receivers which are open on a top side of the frame for receiving a brush guard and a tweezer arm assembly. The tweezer arm assembly has a swingable tweezer arm which is movable using a hydraulic cylinder to grasp objects against an upper surface of the base frame and the blade assembly. The brush guard and the tweezer arm assembly are removable from the base frame as a single unit to reduce shipping size and to facilitate assembly. A sprayer assembly is positioned within the base frame for applying a herbicide to tree stumps cut by the V-shaped blade assembly.

The blade assembly can be a single integral blade with rear blade portions welded to a front blade portion to form a V-shaped blade configuration. Alternatively, the blade assembly can be formed of right and left blades with intermeshing projections secured to a rib member along a centerline of the blade assembly.

According to a broad aspect of the present invention, a tree saw attachment for use with a moving vehicle is provided, comprising: a base frame; a generally V-shaped cutting blade assembly attached to the base frame; and a tweezer arm assembly connected to the base frame, the tweezer arm assembly having a swingable tweezer arm movable to grasp objects against an upper surface of the base frame or the cutting blade assembly.

According to another broad aspect of the present invention, a tree saw attachment for use with a loader is provided, comprising: a base frame having a structure for attaching to the loader; a generally V-shaped cutting blade assembly secured to the base frame; a brush guard removably attached to the base frame and extending above the base frame; and a tweezer arm swingably attached to the brush guard about a pivot axis located above the blade assembly, the tweezer arm being movable to grasp objects against an upper surface of the base frame or the blade assembly.

According to another broad aspect of the present invention, a blade assembly is provided for a tree saw attachment, comprising: a first planar blade having a series of teeth along a first edge for cutting and a plurality of mounting projections along a second edge; a second planar blade having a series of teeth along a first edge for cutting and a plurality of mounting projections along a second edge; the first and second blades being assembled into a V-shaped blade configuration with the mounting projections of the first blade intermeshing with the mounting projections of the second blade; and a rib member secured to the first and second blades by threaded fasteners extending through a first plurality of mounting holes in the mounting projections of the first and second blades.

According to yet another broad aspect of the present invention, a work attachment for use with a loader is provided, comprising: a frame having a coupling means for attaching to a loader arm; a gusset having a rear side attached to the frame and triangular-shaped side walls that extend forward from the frame to a front side, the triangular-shaped side walls forming a peak therebetween along a longitudinal centerline of the gusset, the side walls being configured such that the peak slopes downwardly and forwardly from the rear side to the front side, the triangular-shaped side walls having lower edges that together define a generally V-shaped configuration when viewed in plan view with the front side of the gusset at the apex of the V-shape; a first tubular receiver secured to the front side of the gusset for receiving a corresponding mounting structure of an implement; and second and third tubular receivers on the frame for attaching removable accessories to the frame.

Numerous other objects of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENT

A tree saw attachment having a tweezer arm according to a preferred embodiment of the present invention will now be described with reference to FIGS. 1 to 8 of the accompanying drawings.

Figures 1, 8:
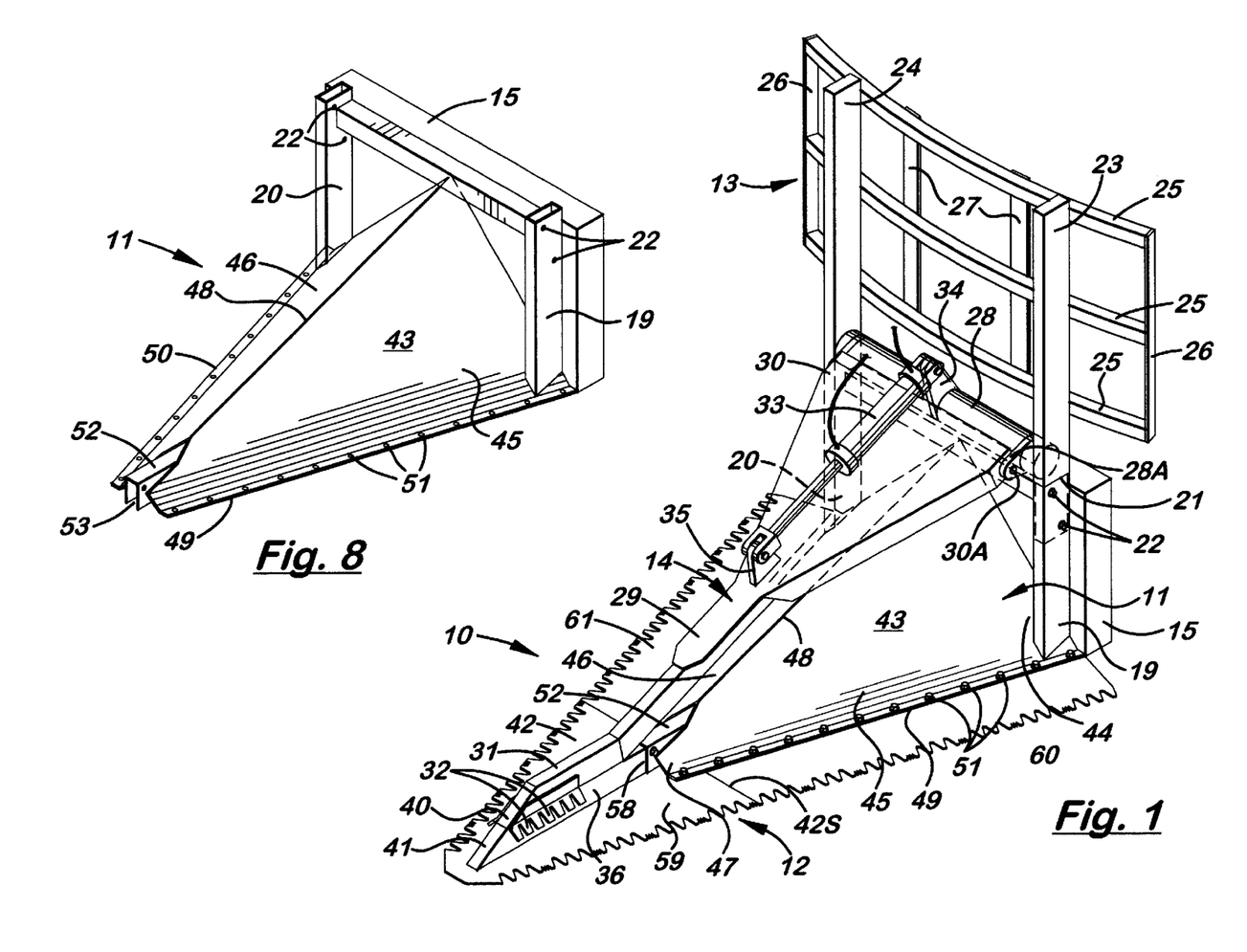
FIG. 1 is a perspective view of a tree saw attachment for a front end loader having a tweezer arm according to the present invention.
FIG. 8 is a perspective view of a base frame of the tree saw attachment with the tweezer arm and blade assemblies removed.

The tree saw attachment 10 of the present invention includes a base frame 11, a V-shaped cutting blade assembly 12, a brush guard 13, and a tweezer arm assembly 14. The base frame 11 has a generally rectangular rear portion 15 with a quick coupler receiver 16 for attaching to a corresponding structure 17 on the boom arms 18 of a front end loader. A pair of upstanding tubular receivers 19, 20 are secured to the rectangular rear portion 15 on right and left sides of the base frame 11. The upstanding tubular receivers 19, 20 are open at their upper ends 21 to removably attach the brush guard 13 and tweezer arm assembly 14 to the base frame 11. The tubular receivers 19, 20 each have a pair of transverse bores 22 formed therein for receiving locking fasteners, such as threaded bolts or pins.

Figure 3:
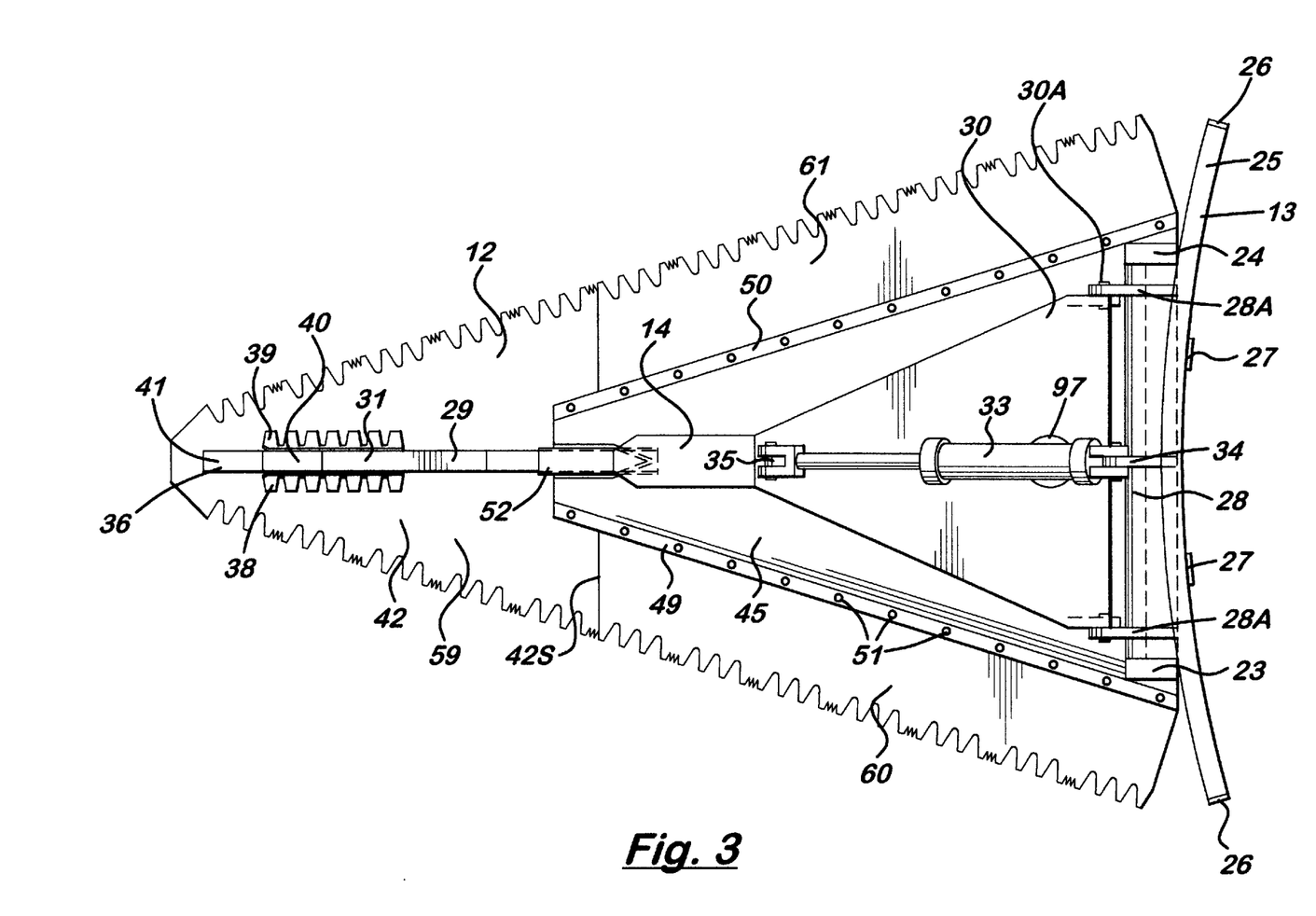
FIG. 3 is a plan view of the tree saw attachment of the present invention shown in FIG. 1.

The brush guard 13 and tweezer arm assembly 14 are mounted as a unit to the base frame 11. First and second vertical legs 23, 24 of the brush guard 13 are removably secured within the upstanding tubular receivers 19, 20. The brush guard 13 includes a plurality of cross bars 25 extending between the first and second vertical legs 23, 24. A first pair of vertical members 26 are secured to and connect the ends of the cross bars 25. A second pair of vertical members 27 are secured to and connect the mid portions of the cross bars 25. The cross bars 25 preferably have an arcuate configuration when viewed in plan view, as shown in FIG. 3. The arcuate configuration of the cross bars 25 serves to deflect and guide objects, such as felled trees, tree branches and so forth, to the sides of the loader and away from the operator during operation.

The tweezer arm assembly 14 includes a cross member 28 extending between the first and second vertical legs 23, 24, and a tweezer arm 29 having a first end 30 pivotally mounted to flanges 28a secured to the cross member 28 for rotation about a transverse axis 30a. The tweezer arm 29 has a second end 31 provided with a series of teeth 32 to facilitate grasping objects. A hydraulic actuator 33 is connected at one end to a flange 34 on the cross member 28 and at another end to a flange 35 on the tweezer arm 29. The hydraulic actuator 33 is operable to extend and retract its length to thereby swing the arm 29 about the transverse axis 30a. The cross member 28 is preferably a round tubular member capable of withstanding high torsional forces generated during operation of the hydraulic actuator 33 to grasp objects with the tweezer arm 29.

The cutting blade assembly 12, which will be described in more detail below, includes a rib member 36 extending along a longitudinal centerline of the blade assembly 12. The second end 31 of the tweezer arm 29 is arranged to abut an upper surface 37 of the rib member 36 in a closed position. The series of teeth 32 at the second end 31 of the tweezer arm 29 includes first and second rows 38, 39 of teeth (see FIG. 3) that extend on respective first and second sides of the rib member 36 when the tweezer arm 29 abuts the upper surface 37 of the rib member 36 in its closed position. The tweezer arm 29 has a tapered front edge 40 that generally matches a tapered front side 41 of the rib member 36.

Figure 2:
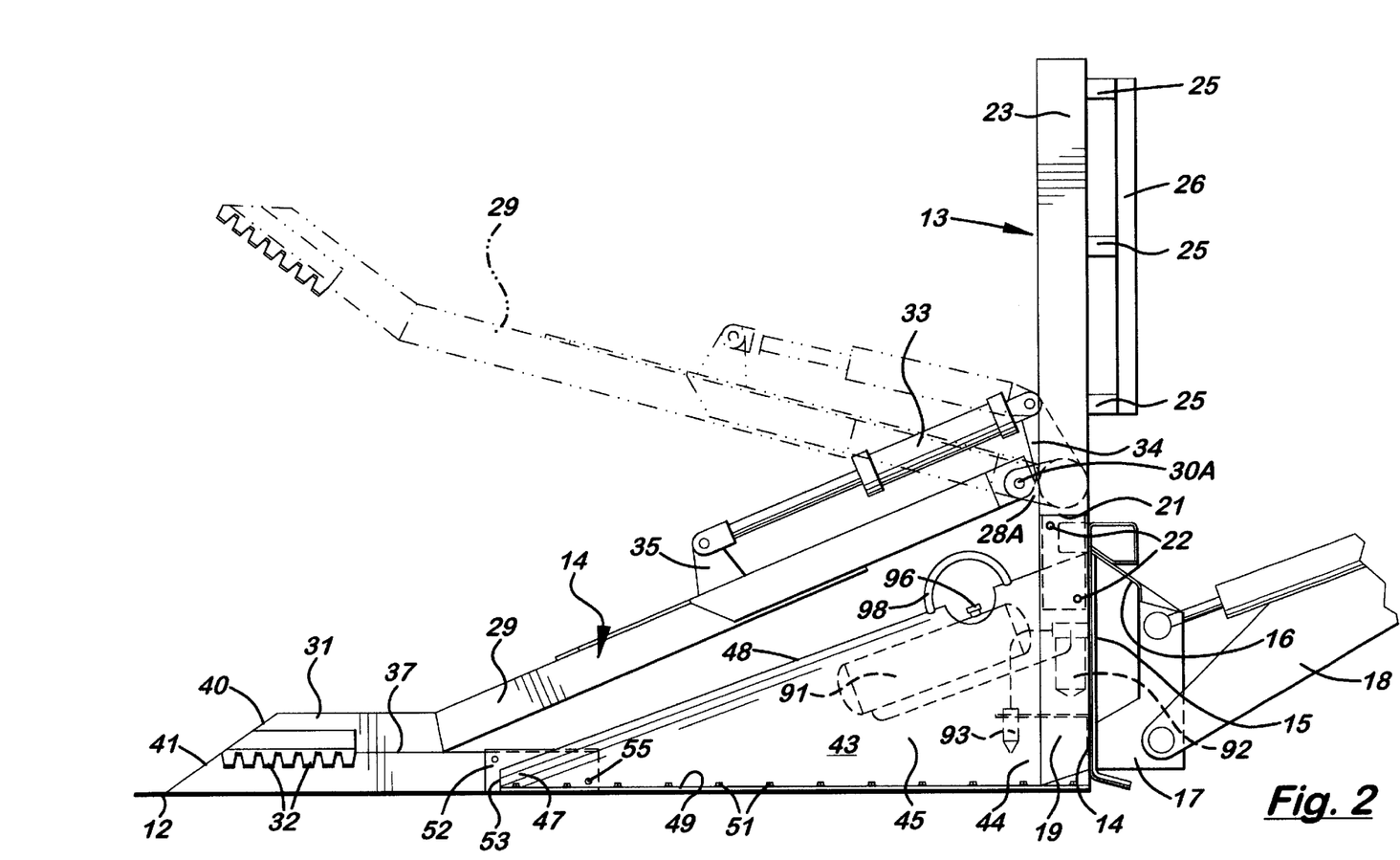
FIG. 2 is a side view of the tree saw attachment of the present invention shown in FIG. 1.

The tweezer arm 29 can be moved by the hydraulic actuator 33 between a closed position, as shown by solid lines in FIG. 2, and an open position, as shown by dashed lines in the same figure. The tweezer arm 29 can be used to grasp objects, such as felled trees, branches, brush and so forth, and to move the same to a common brush pile or the like. Depending on the particular application, the tweezer arm 29 can be moved to press the objects being grasped against the upper surfaces of either the base frame 11, the rib member 36, or even the planar blades 42 of the blade assembly 12. The tweezer arm 29 is particularly useful in conjunction with the V-shaped configuration of the blade assembly 12 because the sides of the V-shape help to stabilize the objects being grasped and carried between the tweezer arm 29 and the base frame 11 or the blade assembly 12.

The base frame 11 will now be described in more detail. The base frame 11 includes a gusset 43 having a rear side 44 attached to the rectangular rear portion 15 of the base frame 11. The gusset 43 has first and second triangular-shaped side walls 45, 46 that extend forward from the rear side 44 of the base frame 11 to a front side 47 of the base frame 11. The triangular-shaped side walls 45, 46 form a peak 48 therebetween along a longitudinal centerline of the gusset 43. The side walls 45, 46 are configured such that the peak 48 slopes downwardly and forwardly from the rear side 44 to the front side 47. The side walls 45, 46 each have lower edges 49, 50 that together define a generally V-shaped configuration when viewed in plan view with the front side 47 of the gusset 43 at the apex of the V-shape. The lower edges 49, 50 of the side walls 45, 46 each have a plurality of bore holes 51 spaced along a length thereof for securing the cutting blade assembly 12 or other implement to the base frame 11. The gusset 43 is preferably formed of a single metal plate member which is bent into the desired configuration at the peak 48 and along each of the lower edges 49, 50.

A tubular receiver 52 is secured to the front side 47 of the gusset 43 for receiving a corresponding mounting structure of the cutting blade assembly 12 or other implement to be attached to the base frame 11. The tubular receiver 52 preferably has a generally rectangular cross section with an open bottom side 53. A pair of transverse bores 54, 55 are formed through the tubular receiver 52 for receiving locking fasteners, such as threaded bolts or pins, to secure the mounting structure of the cutting blade assembly 12 or other implement to be attached to the base frame 11.

The V-shaped cutting blade assembly 12 includes a planar blade 42 having a plurality of teeth formed along an outer edge. The teeth include cutting teeth 56 and gauge teeth 57. The cutting teeth 56 have sharp cutting edges separated by deep recesses for accommodating cut material. The gauge teeth 57 have relatively shallow recesses therebetween which help regulate the depth of cut for each stroke of the blade 42 into a tree. The cutting teeth 56 or the gauge teeth 57 can be bent or "pitched" to extend slightly above and/or below the plane of the blade 42 to increase the cutting width and help prevent the blade 42 from lodging within a tree being cut.

As mentioned above, the rib member 36 is attached to and extends along a longitudinal centerline of the blade assembly 12. The rib member 36 has a front portion 41 that tapers forwardly and downwardly to a generally flat point near an apex of the blade assembly 12. A rear portion 58 of the rib member 36 provides a mounting structure received within the tubular receiver 52 at the front of the gusset 43. The rear portion 58 of the rib member 36 is removably secured within the tubular receiver 52 by a pair of threaded bolts or the like extending through the transverse bores 54, 55.

In the embodiment shown in FIGS. 1 and 3, the planar blade 42 includes a front portion 59 secured to the rib member 36, and right and left rear portions 60, 61 secured to the series of bore holes 51 along the lower edges 49, 50 of the gusset 43. The front portion 59 is preferably welded to the rear portions 60, 61 of the planar blade 42 along a transverse seam 42s to enhance the strength of the blade assembly 12.

Figure 4:
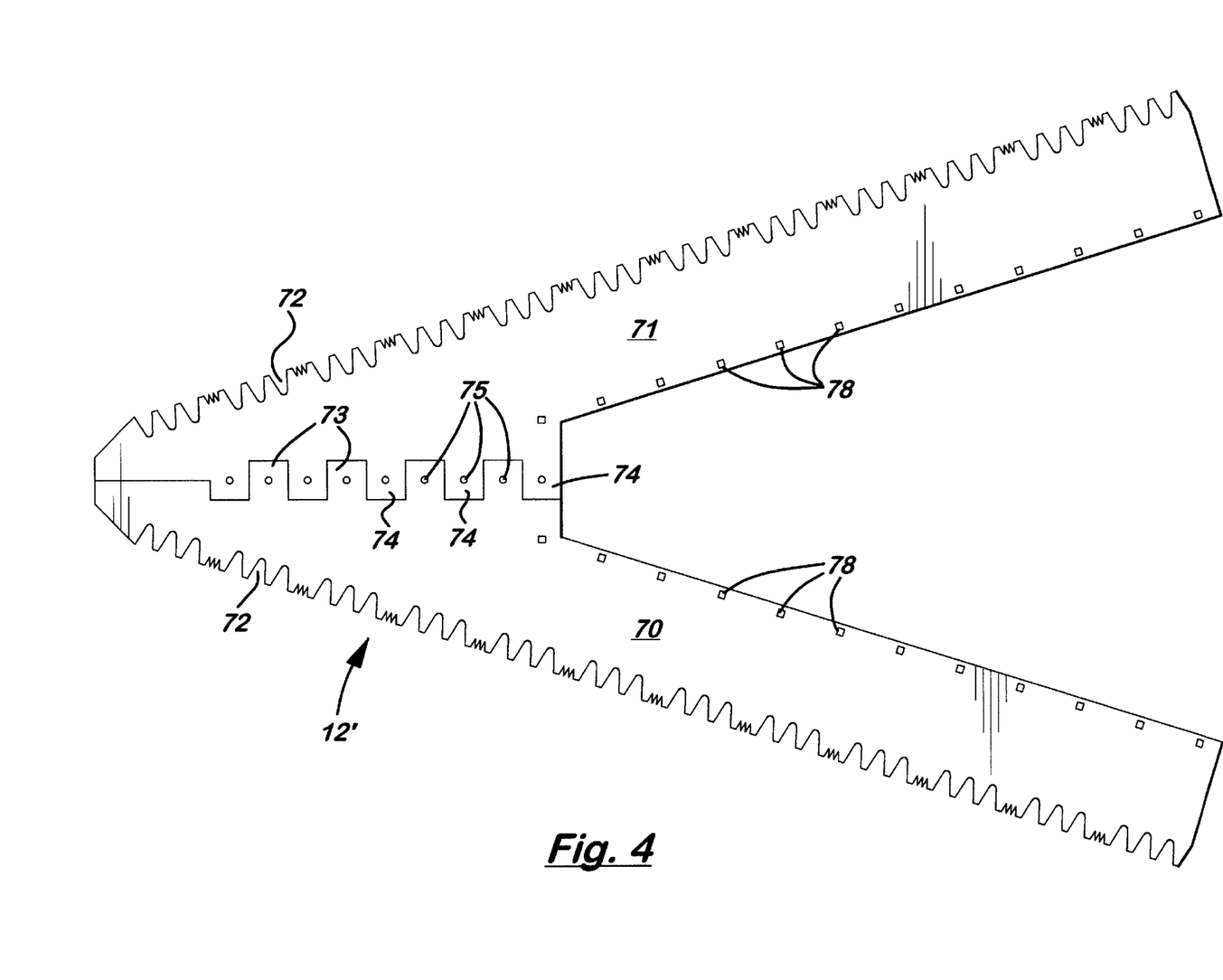
FIG. 4 is a plan view of a two-piece interlocking V-shaped blade for use with the tree saw attachment of the present invention.
Figure 5:
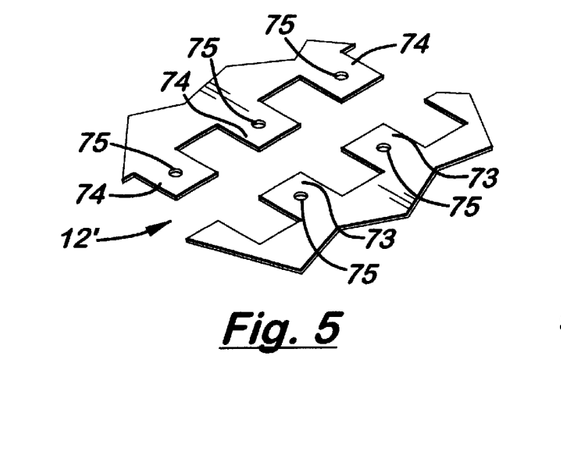
FIG. 5 is a perspective view of a portion of the interlocking structure of the V-shaped blade shown in FIG. 4.
Figure 6:
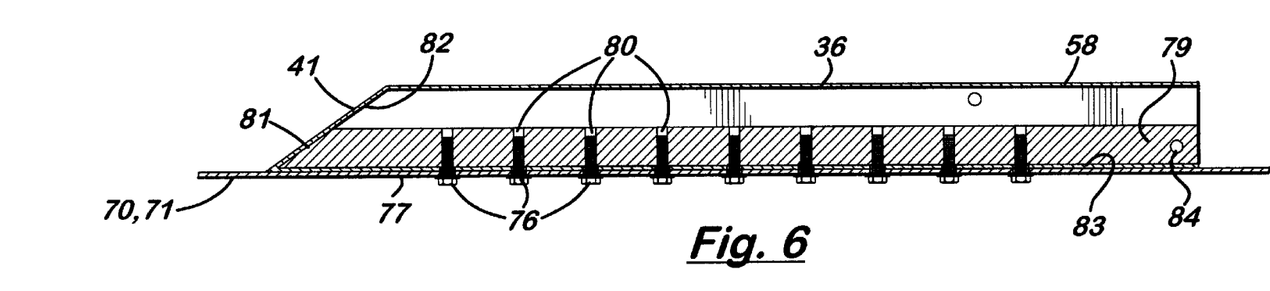
FIG. 6 is a cross sectional side view of the V-shaped blade shown in FIG. 4 and a center beam and mounting structure for securing the blade to the frame of the tree saw attachment.

In an alternative embodiment shown in FIGS. 4, 5 and 6, the V-shaped blade assembly 12' includes first and second planar blades 70, 71 each having a series of teeth 72 along a first edge for cutting and a plurality of mounting projections 73, 74 along a second edge. The first and second blades 70, 71 are assembled into a V-shaped blade configuration with the mounting projections 73 of the first blade 70 intermeshing with the mounting projections 74 of the second blade 71.

A first plurality of mounting holes 75 are formed in the mounting projections 73, 74 for receiving respective threaded fasteners 76 for securing the blades 70, 71 to the bottom side 77 of the rib member 36. The first plurality of mounting holes 75 are aligned generally along a longitudinal centerline of the V-shaped configuration of the assembled blades 70, 71. A second plurality of mounting holes 78 are spaced along respective third edges of each of the first and second blades 70, 71. The second plurality of mounting holes 78 are arranged along a line that extends generally parallel to the toothed sides of the V-shaped configuration of the assembled blades 70, 71.

A bar 79 having a plurality of threaded openings 80 spaced along its length is used to facilitate mounting the blades 70, 71 to the rib member 36. The bar 79 has a tapered front surface 81 that corresponds to the tapered inner surface 82 of the closed front end 41 of the rib member 36. The tapered surface 81 of the bar 79 operates in conjunction with the tapered inner surface 82 of the rib member 36 to position and hold the bar 79 against the bottom wall 83 of the rib member 36 to facilitate assembly of the first and second blades 70, 71 to the rib member 36. A pin member or the like can be inserted through the aligned transverse openings 84 in the rib member 36 and the bar 79 to lock the bar 79 in a position with its threaded openings 80 aligned with the corresponding openings in the bottom wall 83 of the rib member 36.

Figure 7:
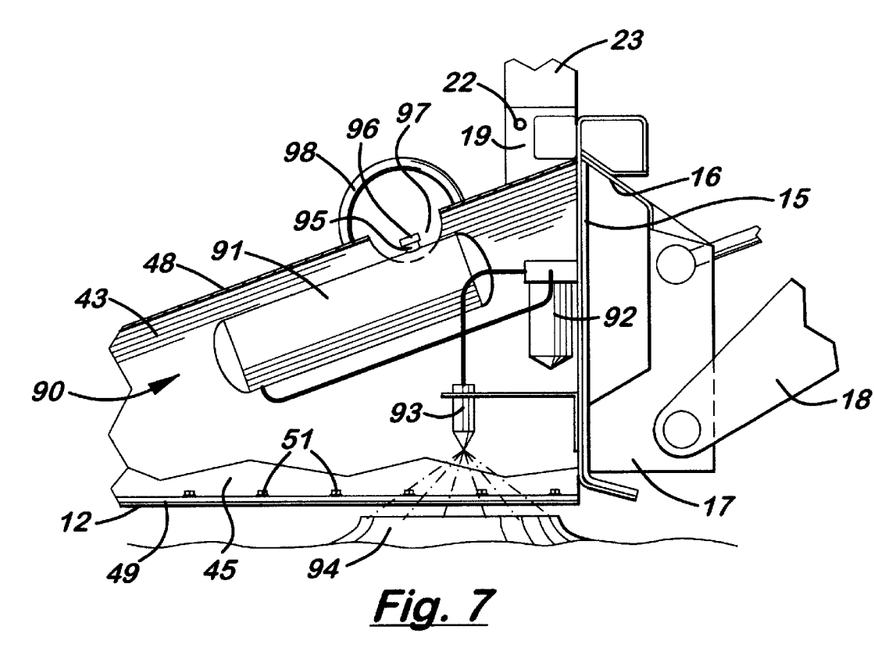
FIG. 7 is a cutaway side view of the tree saw attachment showing a spray tank and spray nozzle for spraying cut stumps.

A sprayer assembly 90 is positioned within the gusset 43 of the base frame 11. The sprayer assembly 90 includes a spray tank 91, a pump 92, and a nozzle 93 arranged to apply a herbicide to tree stumps 94 as the stumps pass beneath the V-shaped blade assembly 12. The spray tank 91 has a fill opening 95 and a lid 96 which are accessible through an access opening 97 formed in the peak 48 of the gusset 43. A protective arcuate member 98 has first and second ends secured to the peak 48 of the gusset 43 on respective first and second sides of the access opening 97. The arcuate member 98 extends over the access opening 97 to protect the fill opening 95 and lid 96 during operation, while allowing convenient access to the spray tank 91 to replenish a supply of herbicide therein. The arcuate member 98 also provides a lifting point for lifting the tree saw attachment 10 during transport and assembly.

In operation, the tree saw attachment 10 is first attached to a front end loader using the conventional coupling structures 16, 17. The saw attachment 10 is then moved by the front end loader to push the V-shaped blade assembly 12 into standing trees, brush, and the like. The V-shaped configuration of the blade assembly 12 allows trees to be cut quickly and efficiently as the front end loader pushes the blade assembly 12 forwardly. After the tree saw attachment 10 cuts through a tree and as it passes over the tree stump, the sprayer assembly 90 located within the V-shaped configuration can be activated to spray a herbicide on the tree stump 94 to prevent regrowth. The cut tree can then be grasped by the tweezer arm 29 and carried to a brush pile where it can be lifted and placed on top of the brush pile, if desired. The tweezer arm 29 can also be used to perform a variety of other functions consistent with its capabilities.

It will be appreciated that certain features of the present invention have separate utility from the tree saw. For example, the base frame structure can be used to support other work attachments, such as a backhoe (not shown), an asphalt/cement cutter (not shown), or an extended boom for lifting (not shown). The tubular receiver on the base frame structure will receive a corresponding structure on the other work attachments, and selected holes along the edge of the base structure can be used, for example, to attach hydraulic cylinders for swinging the backhoe or other implement from side-to-side.

It will also be appreciated that the tree saw attachment of the present invention can be carried by vehicles other than front end loaders. For example, the tree saw attachment described herein can be mounted to a wheeled or tracked vehicle in place of a bull dozer blade or a backhoe bucket.

While the invention has been specifically described in connection with specific embodiments thereof, it is to be understood that this is by way of illustration and not of limitation, and the scope of the appended claims should be construed as broadly as the prior art will permit.

What is claimed is:

1. A tree saw attachment for use with a moving vehicle, comprising:
   a base frame;
   a generally V-shaped cutting blade assembly attached to said base frame; and
   a tweezer arm assembly connected to said base frame, said tweezer arm assembly having a swingable tweezer arm movable to grasp objects against an upper surface of the base frame or the cutting blade assembly.

2. The tree saw attachment as set forth in claim 1, further comprising a hydraulic actuator connected to said tweezer arm which is operable to swing said tweezer arm relative to said base frame and said cutting blade assembly.

3. The tree saw attachment as set forth in claim 1, wherein said tweezer arm has a first end connected to said base frame and a second end provided with a series of teeth to facilitate grasping objects.

4. The tree saw attachment as set forth in claim 1, wherein said cutting blade assembly comprises a rib member extending along a longitudinal centerline of said blade assembly, and said tweezer arm is arranged to abut an upper surface of said rib member when moved to a closed position.

5. The tree saw attachment as set forth in claim 4, wherein said tweezer arm has first and second rows of teeth that extend on respective first and second sides of said rib member when said tweezer arm abuts an upper surface of the rib member in its closed position.

6. The tree saw attachment as set forth in claim 4, wherein said rib member tapers forwardly and downwardly to a generally flat point near an apex of said blade assembly, and said tweezer arm has a tapered front edge that generally matches the taper of the rib member.

7. The tree saw attachment as set forth in claim 1, wherein said base frame comprises a gusset having a rear side and triangular-shaped side walls that extend forwardly from the rear side to a front side, said triangular-shaped side walls forming a peak therebetween along a longitudinal centerline of the gusset, said side walls being configured such that said peak slopes downwardly and forwardly from the rear side to the front side, said triangular-shaped side walls having lower edges that together define a generally V-shaped configuration when viewed in plan view with the front side of the gusset at the apex of the V-shape, and a tubular receiver secured to the front side of the gusset.

8. The tree saw attachment as set forth in claim 7, wherein a portion of said rib member is received within said tubular receiver and removably secured thereto.

9. The tree saw attachment as set forth in claim 1, wherein said tweezer arm assembly is removably secured to said base frame by a pair of tubular receivers positioned at a top of the base frame.

10. The tree saw attachment as set forth in claim 1, further comprising a sprayer assembly positioned within the base frame, said sprayer assembly having a nozzle for applying a herbicide to tree stumps as the stumps pass beneath the V-shaped blade assembly.

11. The tree saw attachment as set forth in claim 10, wherein said sprayer assembly includes a spray tank and a pump connected to the nozzle, said spray tank having a fill opening and a lid which are accessible through an access opening formed in a peak of a gusset plate member of said base frame.

12. The tree saw attachment as set forth in claim 11, further comprising a protective arcuate member having first and second ends secured to the peak of the gusset plate member on respective first and second sides of the access opening, said arcuate member extending over said access opening to protect the fill opening and lid during operation and to provide a lifting point for lifting the tree saw attachment during transport.

13. A tree saw attachment for use with a loader, comprising:
   a base frame having a structure for attaching to the loader;
   a generally V-shaped cutting blade assembly secured to the base frame;
   a brush guard removably attached to the base frame and extending above said base frame; and
   a tweezer arm swingably attached to the brush guard about a pivot axis located above the blade assembly, said tweezer arm being movable to grasp objects against an upper surface of said base frame or said blade assembly.

14. The tree saw attachment as set forth in claim 13, wherein the blade assembly includes a V-shaped metal plate having cutting teeth formed along the edges thereof, and a rib member secured to an upper surface of said metal plate, said tweezer arm being movable to clamp objects against said rib member.

15. A blade assembly for a tree saw attachment, comprising:
   a first planar blade having a series of teeth along a first edge for cutting and a plurality of mounting projections along a second edge;
   a second planar blade having a series of teeth along a first edge for cutting and a plurality of mounting projections along a second edge;
   said first and second blades being assembled into a V-shaped blade configuration with the mounting projections of the first blade intermeshing with the mounting projections of the second blade; and
   a rib member secured to said first and second blades by threaded fasteners extending through a first plurality of mounting holes in the mounting projections of the first and second blades.

16. The blade assembly as set forth in claim 15, wherein said first and second blades each have a second plurality of mounting holes spaced along respective third edges of said blades.

17. The blade assembly as set forth in claim 16, wherein said first plurality of mounting holes are aligned generally along a longitudinal centerline of the V-shaped configuration of the assembled blades, and the second plurality of mounting holes extend generally parallel to the sides of the V-shaped configuration of the assembled blades.

18. The blade assembly as set forth in claim 15, wherein said rib member has a closed front end and an open rear end, and a bar having a plurality of threaded openings is positioned within said rib member, said threaded openings of the bar being arranged to receive the threaded fasteners for securing the first and second blades to the rib member.

19. The blade assembly as set forth in claim 18, wherein the closed front end of the rib member tapers downwardly to a point, and the bar has a tapered surface that corresponds to the taper of the rib member to position and hold the bar against an inner surface of the rib member to facilitate inserting the threaded fasteners into the threaded openings.

20. A work attachment for use with a loader, comprising:
   a frame having a coupling means for attaching to a loader arm;
   a gusset having a rear side attached to the frame and triangular-shaped side walls that extend forward from the frame to a front side, said triangular-shaped side walls forming a peak therebetween along a longitudinal centerline of the gusset, said side walls being configured such that said peak slopes downwardly and forwardly from the rear side to the front side, said triangular-shaped side walls having lower edges that together define a generally V-shaped configuration when viewed in plan view with the front side of the gusset at the apex of the V-shape;
   a first tubular receiver secured to the front side of said gusset for receiving a corresponding mounting structure of an implement; and
   second and third tubular receivers on said frame for attaching removable accessories to said frame.

21. The work attachment according to claim 20, wherein said first, second, and third tubular receivers each have at least one transverse bore formed therein for receiving a locking fastener.

22. The work attachment according to claim 20, wherein said lower edges of said triangular-shaped side walls each have a plurality of bore holes spaced along a length thereof for mounting an implement thereto.

23. The work attachment according to claim 20, further comprising a V-shaped blade assembly having a rib member secured along a longitudinal centerline of said blade assembly, said rib member being received in said first tubular receiver.

24. The work attachment according to claim 20, wherein said second and third tubular receivers are positioned on right and left sides of said frame and are open upwardly.

25. The work attachment according to claim 20, further comprising a brush guard assembly having first and second legs removably secured within said second and third tubular receivers, respectively.

26. The work attachment according to claim 25, wherein said brush guard assembly comprises a plurality of cross bars extending between said first and second legs, said cross bars having an arcuate configuration when viewed in plan view to facilitate deflecting objects to the sides as the loader moves forward.

27. The work attachment according to claim 20, further comprising a tweezer arm assembly supported by first and second legs removably secured within said second and third tubular receivers, respectively, said tweezer arm assembly having a cross member extending between said first and second legs, an arm member pivotally mounted to said cross member about a transverse axis, and a hydraulic actuator connected between the cross member and the arm member, said hydraulic actuator being operable to swing said arm member about said transverse axis to grasp objects between said arm member and said gusset.

* * * * *